May 15, 1956 J. D. PE QUEEN 2,745,183
TOOLMAKER'S SQUARE
Filed Dec. 4, 1952
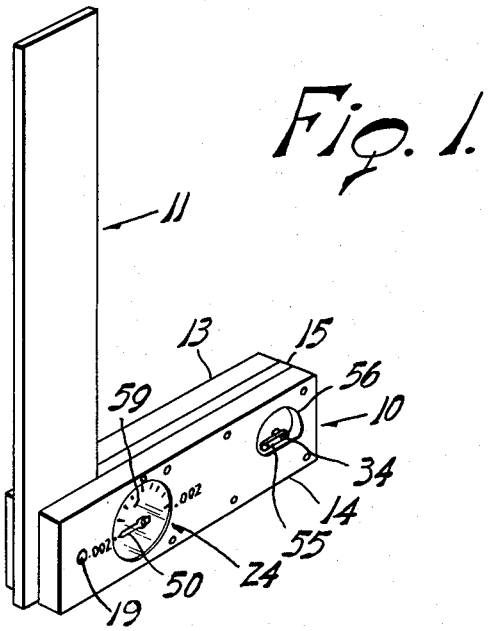
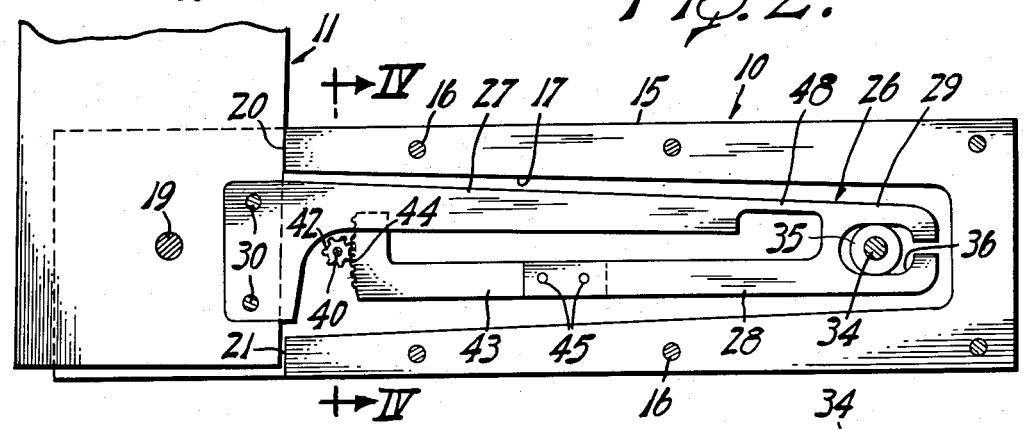
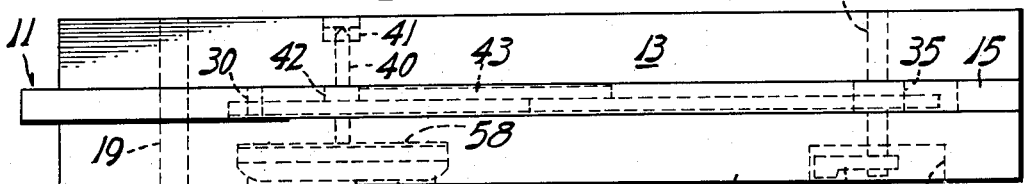
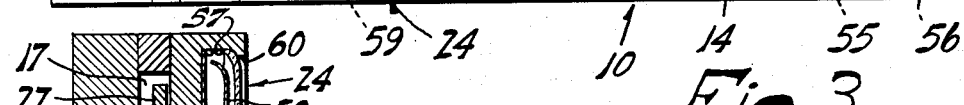
INVENTOR.
JOHN D. PE QUEEN
BY
Beau, Brooks, Buckley & Beau,
ATTORNEYS.

United States Patent Office 2,745,183
Patented May 15, 1956

2,745,183

TOOLMAKER'S SQUARE

John D. Pe Queen, Orchard Park, N. Y.

Application December 4, 1952, Serial No. 324,025

6 Claims. (Cl. 33—75)

This invention relates to a toolmaker's square or other try square and particularly to a tool of this class which affords a direct reading of the deviation of the work from a right angle or other given predetermined angle.

One of the most commonly used tools or instruments among toolmakers, diemakers and others engaged in precision manufacturing is the toolmaker's square which is a simple try square having fixed legs or straightedges extending at right angles to each other. Toolmaker's squares are distinguished only by the fact that they are manufactured with extreme precision. In applying a toolmaker's square to a piece of work to be tested or measured for squareness, the craftsman uses various expedients for observing a lack of squareness and the degree of such lack of squareness of a particular piece of work.

In the first instance such lack of squareness may be observed by the passage of light between the blade of the try square or toolmaker's square and the work at different points along the blade of the square. For more precise observation the toolmaker or diemaker often employs thin tissue papers as feeler gages between the square and the work at various places along the surface or edge being tested. It is obvious that these and other makeshifts and expedients are cumbersome, time-consuming and leave much to be desired in the way of absolute precision, particularly when it is considered that such measurement must often be made to within one ten-thousandth of an inch of angular deviation in a length of several inches.

The present invention provides a toolmaker's square which, when applied to a given piece of work for measuring squareness or correct angularity in any degree, gives a direct precision reading of the variation of the work from the desired degree of angularity. In the form of the present invention shown herein by way of example the blade of the square is arranged to have a small degree of angular movement relative to the head element and means are preferably provided for selectively biasing the blade element to one or another limit of its angular movement in this respect.

Accordingly, when the blade is applied to a piece of work its yieldable bias is so arranged that it automatically lies directly along the work surface to be measured under the pressure of such yieldable bias. The degree of angularity which the blade thus assumes, or the degree of deviation of the blade from the mean or normal angle of the toolmaker's square, is measured directly and precisely by means incorporated within the toolmaker's square itself to give a direct reading, in the present instance in tens of thousandths of an inch. If preferred, the reading of the instrument of the present invention may be graduated in angular measurement or in metric measurement without departing from the principles of the invention.

In a preferred form of the invention the head of the usual try square comprises a housing which encloses motion-multiplying means and the head of the instrument includes a dial from which the user may directly observe and read the angular deviations of a particular measurement or testing or inspection operation.

A single complete embodiment of the principles of the present invention is illustrated in the accompanying drawing and is described in detail in the following specification. However, it is to be understood that such embodiment is set forth by way of example only and that various mechanical modifications may be made therein without departing from the principles of the present invention, such principles being limited only as defined in the appended claims.

In the drawing:

Fig. 1 is a general perspective view of one form of the toolmaker's square of the present invention;

Fig. 2 is an enlarged elevational view of the head portion of the toolmaker's square of Fig. 1 with a portion thereof removed for added illustration;

Fig. 3 is a top plan view of the square of Figs. 1 and 2, looking down edgewise on the same; and Fig. 4 is a cross-sectional view on the line IV—IV of Fig. 2.

Like characters of reference denote like parts in the several figures of the drawing and the numeral 10 designates generally what shall be referred to hereinafter as the head of the toolmaker's square illustrated herein and the numeral 11 designates generally what shall hereinafter be referred to as the blade thereof.

The head 10 is made up of a pair of outer plate members 13 and 14 and a central spacer member 15. The plate members 13 and 14 and spacer member 15 are permanently riveted to each other as shown at 16 to form a rigid integral head member. Spacer member 15 is of generally U-shape to form a chamber 17 within the head member 10 and stops short of the left-hand end of head member 10 as viewed in Figs. 1 through 3 to form a bifurcated space between the outer plate members for receiving the inner or root end of blade 11. A fulcrum pin 19 forms a precision pivotal connection between blade 11 and head member 10 and pivotal movement of blade 11 is limited by engagement of its right-hand inner edge portion with the surfaces 20 and 21 which form the left-hand extremities of spacer member 15 as viewed in Fig. 2.

The edges 20 and 21 of spacer member 15 and the abutting edge surface of blade 11 are so formed and arranged that, in the particular embodiment illustrated by way of example herein, limiting abutment of the blade 11 with the surfaces 20 and 21 occurs when the outer portion of blade 11 (the upper portion as viewed in Fig. 1) deviates four one-thousandths of an inch in either direction from the vertical. This degree of deviation will produce a deviation in either direction of two one-thousandths of an inch at a point along the blade 11 which is midway from the top of the head member 10 to the upper end of blade 11, as viewed in Figs. 1 and 2. It is the deviation at this point along blade 11, the mid-point as far as its effective length is concerned, which is measured and calibrated by the indicating means which is presently to be described.

A dial which is generally designated 24 in Fig. 1 is calibrated directly to indicate the amount of deviation of blade 11 from a right angle with respect to head member 10. The chamber 17 within head member 10 houses motion-multiplying means acting between blade 11 and the dial indicating means 24 and the motion-multiplying means includes a beam member designated generally 26 which comprises upper and lower leg portions 27 and 28 and a connecting yoke portion 29 at the right-hand end thereof as viewed in Fig. 2. The left-hand end of leg portion 27 of beam member 26 is fixed to blade 11. In the present instance the end of leg portion 27 seats in a recess formed in blade 11 and is riveted thereto as at 30.

A pivot pin 34 bears at opposite sides in the outer plate members 13 and 14 of head member 10 and has a medial eccentric enlargement 35 which is disposed within the chamber 17 of head member 10 and engages within a bifurcation 36 formed in the yoke portion 29 of beam member 26 to give fulcrum support to the right-hand end of the beam member. It is preferred that the bifurcation 36 be sprung apart slightly in disposing the same about the eccentric portion 35 of pivot pin 34 to insure a snug and precise fit between the eccentric portion 35 and the bifurcation 36. Thus, the eccentric portion 35 of pivot pin 34 serves as a shiftable or adjustable fulcrum for the right-hand end of beam member 26, the fulcrum being shiftable up and down as viewed in Fig. 2.

The central operating shaft of dial indicator 24 is designated 40 and may be provided with a jewel bearing 41 or other precise pivotal mounting in the outer plate portion 13 of head member 10. Indicator shaft 40 has fixed thereto a pinion 42 which is disposed in the chamber 17 of head member 10 and a gear member 43 is fixed to the left-hand or outer end of lower leg portion 28 of beam member 26 as by means of rivets 45 indicated in Fig. 2. Gear member 43 has a toothed gear sector portion 44 meshing with pinion 42, gear member 43 combining with lower leg portion 28 to provide arm means having its effective rotative center at the center of the eccentric portion 35 of pivot shaft 34. Gear member 43 may be of brass or bronze to provide good meshing engagement with pinion 42.

The leg portion 27 of beam member 26 is provided with an attenuated portion 48 which is spring tempered and serves as a flexible connection between the outer portion of leg portion 27 and the portion to the right thereof, including the yoke portion 29 and lower leg portion 28. By reason of the attenuated spring connection 48, pivotal movement of blade 11 in a clockwise direction as viewed in Fig. 2 carries with it the connected portion of leg member 27 and acts through spring portion 48 to move the remainder of beam member 26, that is, the portion including yoke member 29 and lower leg member 28, in a counterclockwise direction about the fulcrum comprising the eccentric portion 35 of pivot pin 34. This movement produces greatly multiplied angular movement of pinion 42 in a clockwise direction and moves therewith a dial indicator hand 50 which is mounted to normally rotate with dial pivot shaft 40 but is held against relative rotation thereon only by the force of friction, so that dial indicating hand 50 may be shifted relative to dial shaft 40 for adjusting or setting purposes in a manner which will presently appear.

Referring again to the pivot pin 34, the eccentric portion 35 thereof has an eccentricity of about two one-thousandths of an inch with respect to the axis of pivot pin 34 and, in the position illustrated in Fig. 2, eccentric portion 35 is disposed so that its larger portion is lowermost. This tends to rock the entire assembly, including blade 11 and beam member 26, in a clockwise direction about fulcrum pin 19, and thus the inner edge of blade 11 is in abutment with the end surface 20 of spacer member 15.

A manipulating finger portion 55 is fixed to an end of pivot pin 34 and is preferably disposed in a recess 56 formed in the outer surface of outer plate member 14 of head member 10. By manipulation of this finger member 55, pivot pin 34 may be rotated through 180° to reverse the eccentricity of eccentric portion 35, thus rotating the entire assembly of blade 11 and beam member 26 in a counterclockwise direction about fulcrum 19 until the edge of blade 11 abuts the lower left-hand edge portion 21 of spacer member 15.

The position in which the parts are shown in Fig. 2 is the position ordinarily employed when a workpiece or test block is to be applied to the square in the included angle formed by blade 11 in head member 10. The opposite position of blade 11 is that to which it is normally adjusted when its left-hand edge is to be placed against a block of work or the like to be tested, the head member 10 of the tool and the workpiece then normally being disposed side by side upon a surface plate or the like.

With the parts in the position indicated in Figs. 1 and 2, the upper portion of blade 11 is biased to its right-hand limit position, the included angle being slightly acute, and the dial pointer 50 indicates a maximum deviation of two thousandths of an inch from a right angle, this deviation being measured at a point midway along the working portion of blade 11. If a workpiece or block be placed in the included angle between head member 10 and blade 11 and if such block or the corner of it being measured is approximately a right angle, that is, within two thousandths either way from a right angle as indicated above, its left-hand edge, as so positioned, will bear against the inner edge of blade 11 and pivot the latter against the resistance of spring portion 48 in such manner that blade 11 will engage snugly against this vertical edge of the workpiece. At the same time, dial shaft 40 will be rotated so that its pointer 50 will automatically indicate the amount which the angularity of the workpiece deviates from a true right angle, such amount being measured in thousandths of an inch from the zero mid-point of a dial 58 which is about to be described.

Referring now particularly to Fig. 4 for a description of the dial indicator portion of the tool or instrument, it will be noted that the dial pointer or indicator 50 is disposed in an enlarged bore 57 formed in the outer plate member 14 of head member 10. A fixed dial disc 58 is disposed in bore 54 and a front protective lens element 59 normally seats against a flange formation 60 at the outer end of bore 57. A light coil spring 61 is disposed between disc 58 and the rim portion of lens member 59 and normally projects and seats the latter against flange 60.

It is desirable to adjust the dial pointer 50 frictionally on dial shaft 40 from time to time to properly adjust or set the instrument, and for this purpose it is merely necessary to press against the outer face of lens element 59 to press the same against pointer or hand 50 against the light resistance of spring 61. With the lens thus depressed against pointer or hand 50 it is possible to rotate the lens in bore 57 and thus rotate hand or pointer 50 on dial shaft 40 to a dead-zero position or to an accurate end limit position, depending on the existing position of blade 11.

What is claimed is:

1. A try square comprising a head portion and a blade portion pivoted thereto, said head portion having a longitudinal chamber therein and a dial indicator, an elongated member fixed to said blade for pivotal movement therewith and extending lengthwise in said chamber, and motion multiplying means acting between the distal end of said elongated member and said dial indicator for indicating relative pivotal positions of the head portion and the blade portion on said dial indicator on an enlarged scale.

2. A try square comprising a head portion and a blade portion pivoted thereto, said head portion having a longitudinal chamber therein and a dial indicator, means limiting the pivotal movement of said blade portion in one direction, an elongated member fixed to said blade for pivotal movement therewith and extending lengthwise in said chamber, and motion multiplying means acting between the distal end of said elongated member and said dial indicator for indicating relative pivotal positions of the head portion and the blade portion on said dial indicator on an enlarged scale, and resilient means acting upon said elongated member and motion multiplying means for biasing said blade member to said limit of pivotal movement.

3. A try square comprising a head portion and a blade portion pivoted thereto, said head portion having a longitudinal chamber therein and a dial indicator, means limiting the pivotal movement of said blade portion in either direction, an elongated member fixed to said blade and extending lengthwise in said chamber, and motion multiplying means acting between the outer portion of said elongated member and said dial indicator for indicating relative pivotal positions of the head portion and the blade portion on said dial indicator on an enlarged scale, resilient means acting upon said elongated member and said motion multiplying means for biasing said blade in one direction of pivotal movement, and means for selectively reversing said resilient means to bias said blade in the opposite direction.

4. A try square comprising a head portion and a blade portion pivoted thereto, said head portion having a longitudinal chamber therein and a dial indicator, an elongated member fixed to said blade and extending lengthwise in said chamber, arm means in said chamber and pivoted thereto adjacent to the outer end of said head portion and extending generally inwardly thereof for operative connection with said dial indicator, and means acting between the distal end of said elongated member and said arm means for transmitting relative pivotal movements of the blade portion to said dial indicator on an enlarged scale.

5. A try square comprising a head portion and a blade portion pivoted thereto, said head portion having a longitudinal chamber therein and a dial indicator, an elongated member fixed to said blade and extending lengthwise in said chamber, arm means in said chamber and pivoted thereto adjacent to the outer end of said head portion and extending generally inwardly thereof for operative connection with said dial indicator, means acting between the distal end of said elongated member and said arm means for transmitting relative pivotal movements of the blade portion to said dial indicator on an enlarged scale, and means yieldably biasing said blade portion in one direction of pivotal movement.

6. A try square comprising a head portion and a blade portion pivoted thereto, said head portion having a longitudinal chamber therein and a dial indicator, an elongated member fixed to said blade and extending lengthwise in said chamber, arm means in said chamber and pivoted thereto adjacent to the outer end of said head portion and extending generally inwardly thereof for operative connection with said dial indicator, means acting between the distal end of said elongated member and said arm means for transmitting relative pivotal movements of the blade portion to said dial indicator on an enlarged scale, and selectively reversible means yieldably biasing said blade portion in either direction of pivotal movement.

References Cited in the file of this patent

UNITED STATES PATENTS

| 1,073,089 | Bowers | Sept. 16, 1913 |
| 1,427,132 | Swartout | Aug. 29, 1922 |
| 2,129,311 | Street | Sept. 6, 1938 |
| 2,487,844 | Bigham | Nov. 15, 1949 |